United States Patent [19]
Drechsel et al.

[11] 3,956,464
[45] *May 11, 1976

[54] PREPARATION OF PHOSPHATES

[75] Inventors: Erhart K. Drechsel, Houston, Tex.; John B. Sardisco; James R. Stewart, Jr., both of Shreveport, La.

[73] Assignee: Pennzoil Company, Shreveport, La.

[ * ] Notice: The portion of the term of this patent subsequent to Oct. 10, 1989, has been disclaimed.

[22] Filed: Apr. 19, 1971

[21] Appl. No.: 135,297

Related U.S. Application Data

[63] Continuation-in-part of Ser. No. 81,280, Oct. 16, 1970.

[52] U.S. Cl............................... 423/308; 71/34; 71/43; 423/312; 423/202
[51] Int. Cl.² ................ C01B 13/16; C01B 20/20
[58] Field of Search............. 23/106 A, 106 R, 107, 23/165; 423/304–321, 167, 202; 71/34, 43

[56] References Cited
UNITED STATES PATENTS

| | | | |
|---|---|---|---|
| 3,124,419 | 3/1964 | Germain | 23/165 |
| 3,547,615 | 12/1970 | Beckham | 71/34 |
| 3,600,152 | 8/1971 | Drechsel et al. | 71/34 |
| 3,697,246 | 10/1972 | Drechsel et al. | 71/34 |
| 3,718,453 | 2/1973 | Thompson | 71/34 |

FOREIGN PATENTS OR APPLICATIONS
739,119  11/1969  Belgium

OTHER PUBLICATIONS

Thompson, New Route Cuts Costs for Potassium Orthophosphates, Chemical Engineering, Apr. 5, 1971, pp. 83–85.

*Primary Examiner*—Oscar R. Vertiz
*Assistant Examiner*—Gregory A. Heller
*Attorney, Agent, or Firm*—Lowe, King, Price & Markva

[57] ABSTRACT

Potassium phosphates useful as fertilizer materials, are produced by the reaction of phosphate rock or a solubilized form thereof, concentrated sulfuric acid and potassium hydrogen sulfate wherein the potassium hydrogen sulfate is added in a controlled manner and preferably in admixture with at least a portion of the sulfuric acid, the precipitated calcium sulfate precipitate is removed and the filtrate processed for recovery of the potassium phosphates. In further embodiments, high-sulfate containing filtrates are treated to lower the sulfate ion content of the products and effect partial neutralization by any of several methods such as by treatment thereof with fresh phosphate rock or source of calcium ion such as calcium oxide, alternatively or successively, and the resulting solution is used as a fertilizer, or liquids are removed and the solids are dried and/or dehydrated for recovery of the potassium phosphate compounds. Also methods are provided for the addition of nitrogen values.

24 Claims, 7 Drawing Figures

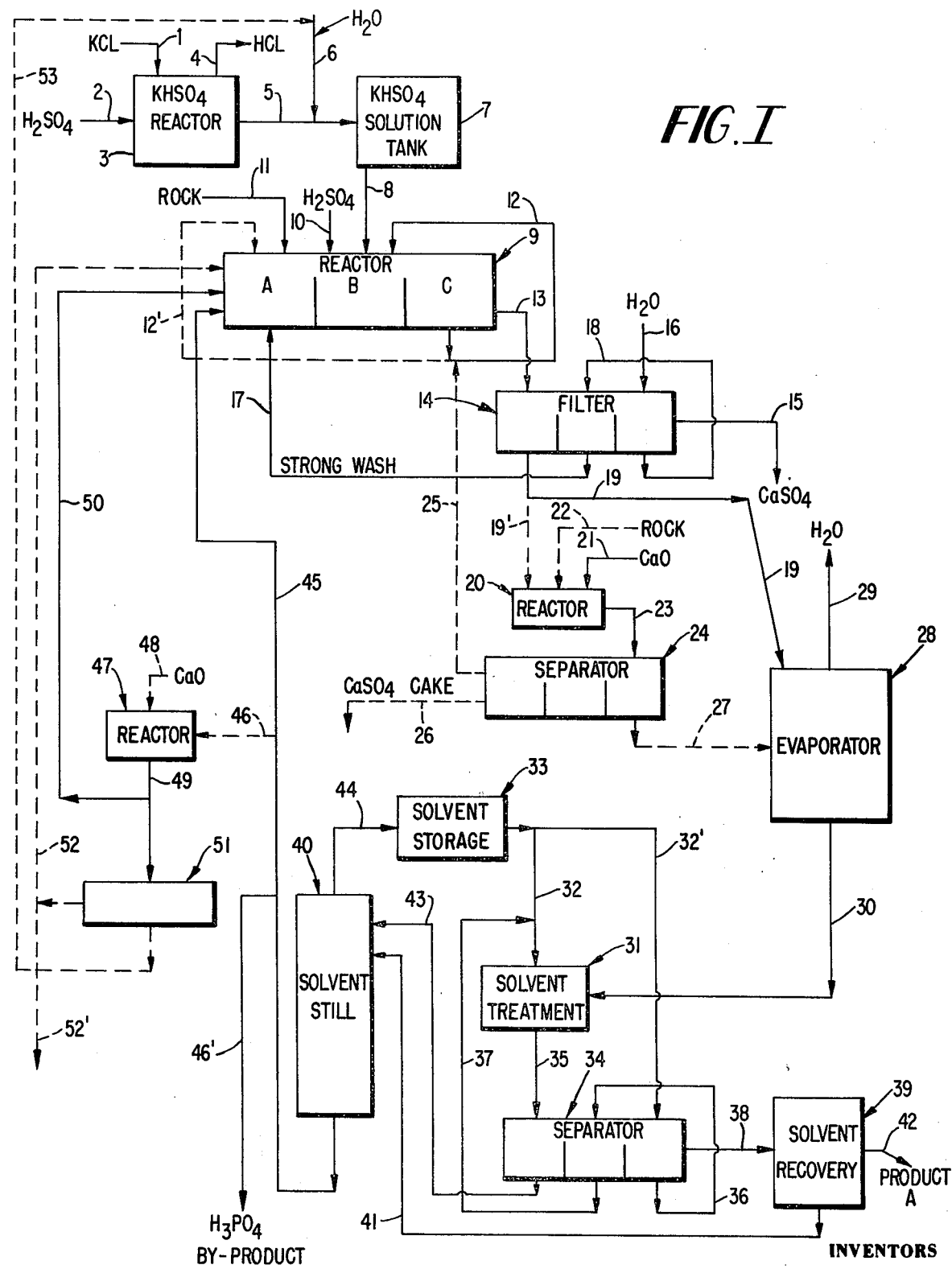
FIG. I

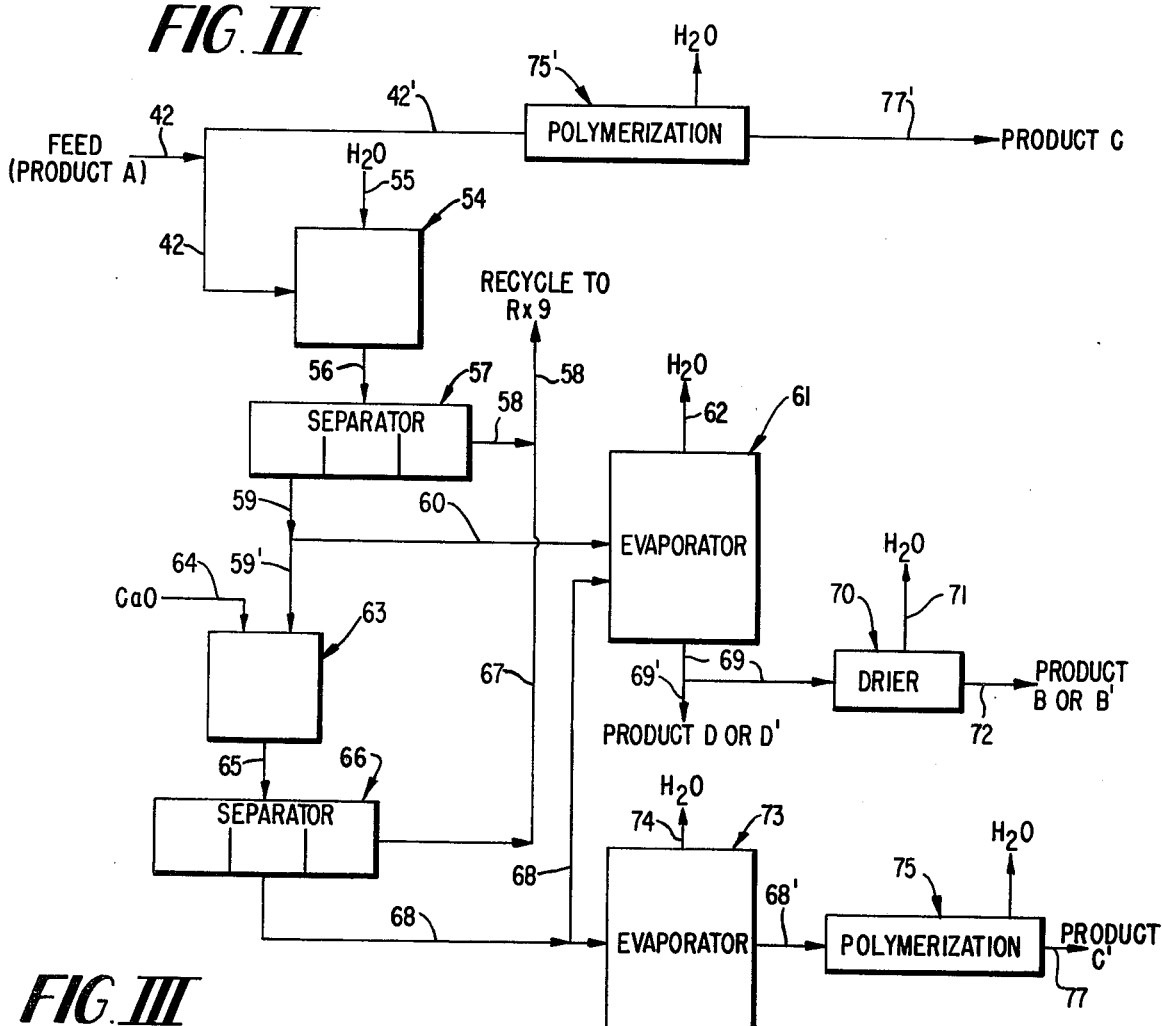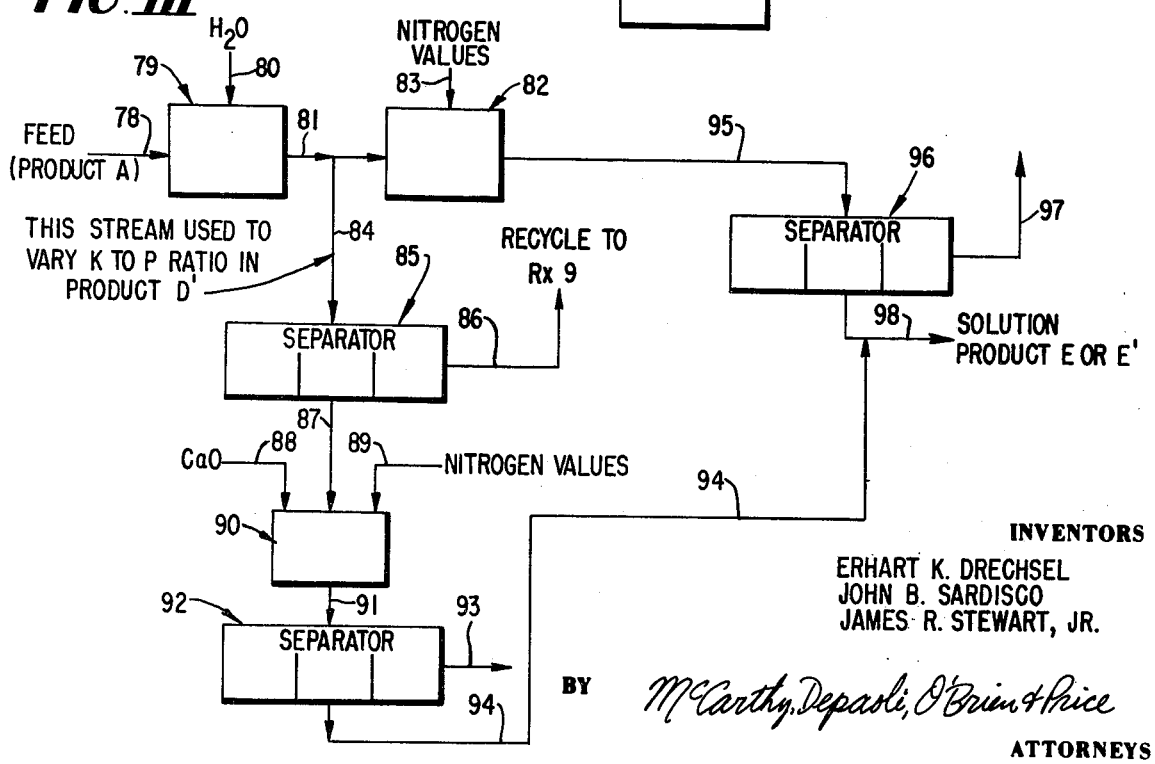

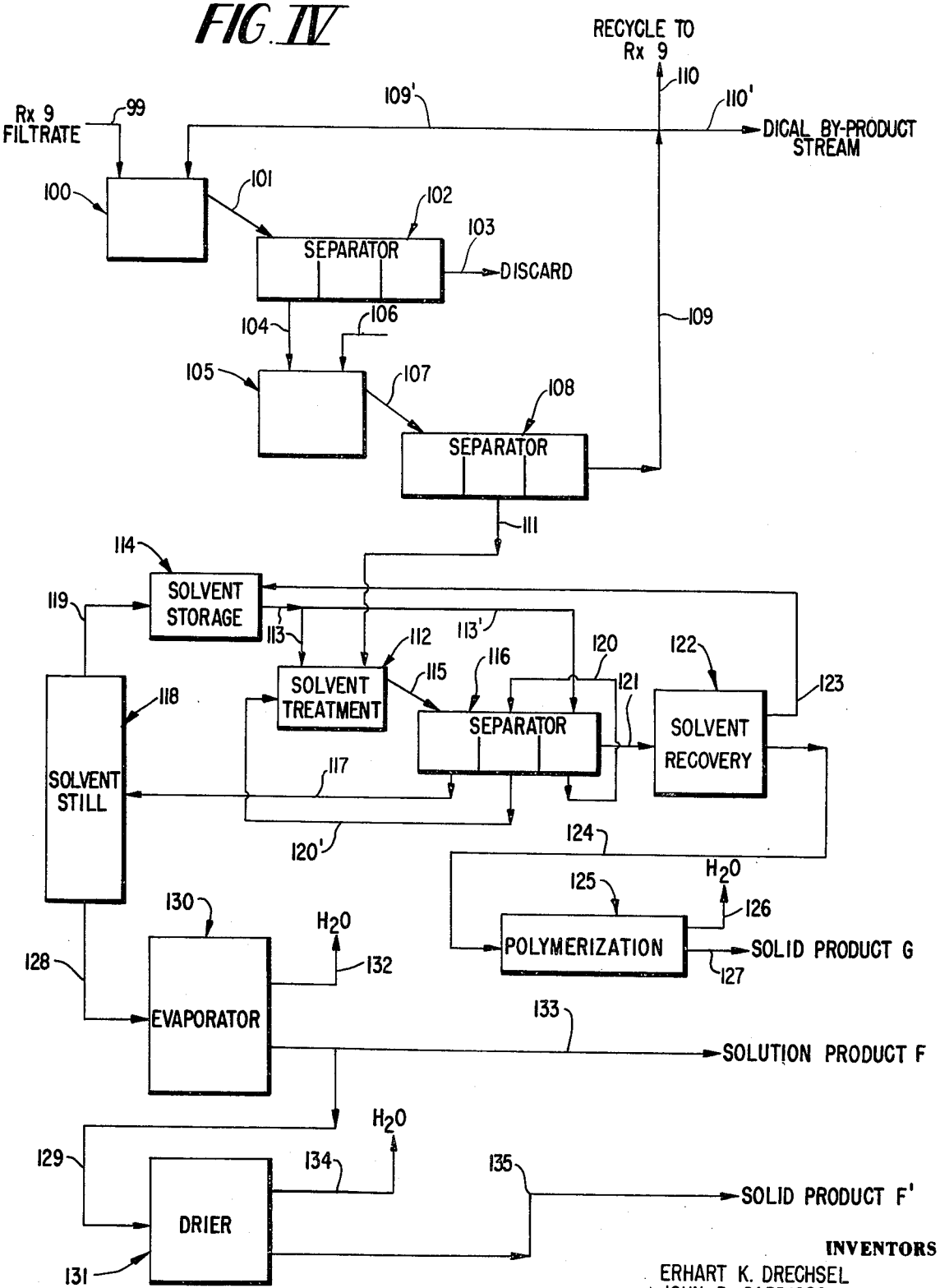

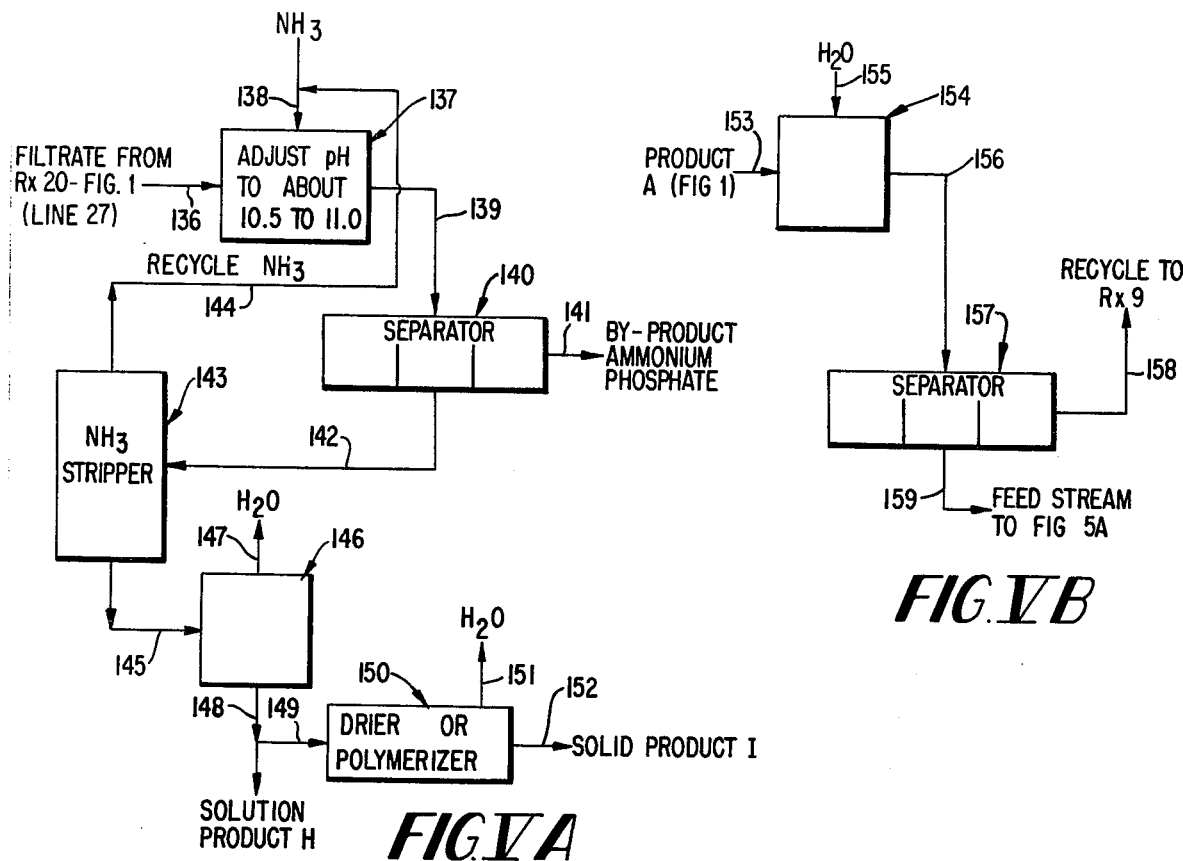
FIG. VA
FIG. VB
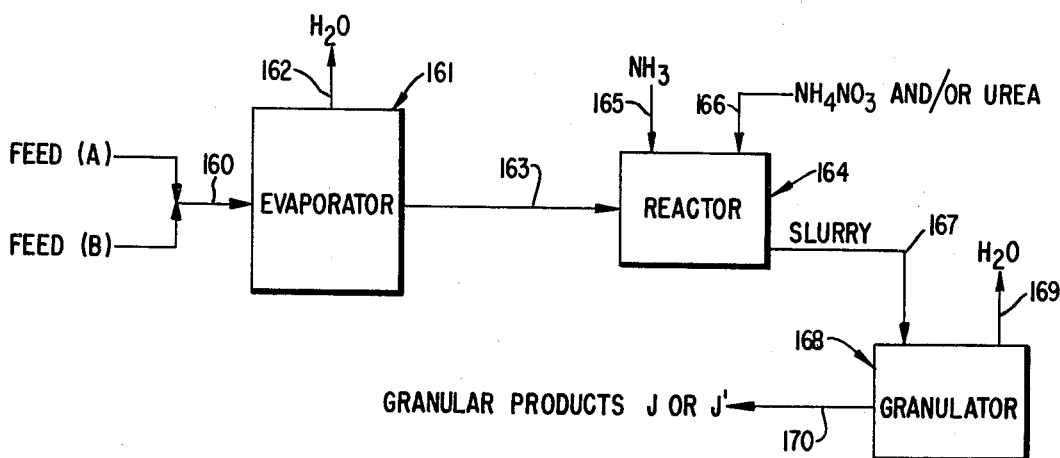
FIG. VI

PREPARATION OF PHOSPHATES

CROSS-REFERENCES TO RELATED APPLICATIONS

This application is related to U.S. Application Ser. No. 755,699, now U.S. Pat. No. 3,600,152, and is a continuation in part of Application Ser. No. 81,280, filed Oct. 16, 1970.

BACKGROUND OF THE INVENTION

1. Field of the Invention

This invention relates to processes for the production of mixtures of potassium phosphates and potassium polyphosphates from phosphate rock or a solubilized form, sulfuric acid and potassium hydrogen sulfate wherein the reaction may be carried out in a continuous manner.

2. Description of the Prior Art

In the first application above-identified of two of us, there are disclosed and claimed potassium polyphosphate products, processes for preparation of mixtures of potassium dihydrogen phosphate and potassium monohydrogen phosphate and the treatment of these mixtures by heating at an elevated temperature to produce a novel reaction product mixture having variable water solubility and variable molecular weight, which mixture is eminently suitable as a fertilizer material. In this prior application, there are disclosed procedures for the preparation of these mixtures which generally comprise reaction of an acid such as phosphoric acid or sulfuric acid or mixtures thereof with phosphate rock or a solubilized form in the presence of potassium sulfate or potassium hydrogen sulfate at temperatures in the range of about 40° to 90°C. The second-named application of two of us provides refinements on this basic process. The present invention provides an improved and refined process for the preparation of the desired intermediate potassium phosphates wherein the phosphates may be prepared in a purity suitable for use as an intended fertilizer or for further conversion to potassium polyphosphate products.

Various processes are known in the prior art for the reaction of phosphate rock and an acid such as sulfuric acid or phosphoric acid or mixtures thereof, processes of these types being referred to generally as phosphate rock acidulation. Quite often potassium sulfate, and in some cases, potassium hydrogen sulfate, may be added to precipitate the calcium present in the mixture as calcium sulfate. These patents are for example, U.S. 1,866,657, 2,046,829, 1,747,588, 744,128, 1,037,837, 1,447,544, 2,046,841, 2,046,842 and 1,961,127. However, these processes fail to provide fertilizers sufficiently pure to be useful in the intended area of use. Moreover, these patents fail to provide workable processes for conducting the reaction in an economical manner.

It is therefore clear that a distinct need remains in the art for procedures by which the desired potassium phosphates can be prepared in an amount and purity sufficiently high that they can be used for the purposes set forth in our above-identified copending application. Our last-mentioned application discloses and claims a number of improvements in this area. The process of the present invention meets these objectives and also provides a more refined and improved process over that disclosed and claimed in out last-mentioned copending application.

SUMMARY OF THE INVENTION

It is accordingly one object of this invention to provide procedures for the preparation of potassium phosphates which are obtained in good yields and high purity.

It is a further object of this invention to provide procedures whereby these materials may be prepared by the reaction of phosphate rock or a solubilized form thereof, sulfuric acid and potassium hydrogen sulfate in a continuous manner.

A still further object of the invention is to provide processes wherein phosphate rock or a solubilized form thereof, sulfuric acid and potassium hydrogen sulfate are reacted so as to prepare potassium phosphates wherein the sulfate and chloride contents are sufficiently low that the products will have wide acceptance as fertilizer materials.

Other objects and advantages of the present invention will become apparent as the description thereof proceeds.

In satisfaction of the foregoing objects and advantages, there is provided by this invention a process for the preparation of potassium phosphates which comprises reacting phosphate rock, or a solubilized form thereof, sulfuric acid, recycle phosphoric acid, and potassium hydrogen sulfate at a temperature of about 40-90°C., wherein the potassium hydrogen sulfate is added in a controlled manner within certain concentration limits to the other reactants during the reaction and the calcium sulfate insoluble salt is removed to provide a resulting filtrate containing the potassium phosphates. Also provided are embodiments for treatment of product-containing streams with a source of calcium ion such as from phosphate rock, calcium oxide, monocalcium, dicalcium or tricalcium phosphate, or any of these materials, either alternatively or successively, and subsequently separating solids to result in a solution having a lowered sulfate ion content and/or a higher pH. Also provided by the present invention is a process by which the reaction is conducted in a continuous manner with continuous recycle of reaction slurries, solution and solids so that the calcium sulfate crystals produced are formed in sufficient size to be easily removed from the slurry. Also included in the process is a preliminary step wherein the potassium hydrogen sulfate is provided by the reaction of potash (commercial potassium chloride) and sulfuric acid.

BRIEF DESCRIPTION OF THE DRAWING

Reference is now made to the drawings accompanying the application on which there are set forth schematic outlines of continuous processes with alternative embodiments for practicing the process of the invention.

DESCRIPTION OF PREFERRED EMBODIMENTS

As indicated above, the process of this invention is concerned with the preparation of potassium phosphates and more particularly to processes for producing potassium dihydrogen phosphate and mixtures thereof with potassium monohydrogen phosphate, by the reaction of phosphate rock or a solubilized form thereof, sulfuric acid and potassium hydrogen sulfate. This reaction may be conducted using varying amounts of sulfuric acid and potassium hydrogen sulfate to result in the desired products.

In practicing this reaction, a number of critical criteria must be observed in order to obtain optimum results and products having sufficient purity to be useful in the fertilizer industry. Thus, in the process of this invention, the phosphate rock or solubilized form thereof, is contacted with recycle streams at an elevated temperature and the potassium hydrogen sulfate and sulfuric acid are added thereto in a controlled manner. In a preferred operation, an agitated solution of the phosphate rock and the recycle solutions are maintained at a temperature of about 40°–90°C. and an aqueous 10 to 50% solution of the potassium hydrogen sulfate and sulfuric acid is added in a controlled manner to minimize concentration gradients and to maintain proper water balance in the system. The preferable range of $KHSO_4$ is 30–50% by weight and of $H_2SO_4$ is 4 to 10% by weight. Careful control of the method of addition of the potassium hydrogen sulfate and acid streams aid the process in minimizing formation of the insoluble double salts $KHSO_4 \cdot CaSO_4$ and/or $KHSO_4 \cdot 5CaSO_4$. The double salts prevent complete formation of the desired products and the potassium in the double salt is difficult to recover from the by-product cake. Accordingly, the controlled method of addition of the potassium hydrogen sulfate in solution form to the other reactants represents an unexpected and important aspect of the present invention and is critical to the efficiency of the reaction.

In the reaction, it is also desirable that the concentration of dissolved solids not exceed about 60% and preferably lie in a range of 10–50%, as higher concentrations of dissolved solids, which is often found in phosphoric acid plants, is not optimum because of the differences in solubilities of the salts present. Therefore, a maximum of about 40% by weight of the dissolved solids is desirable in conducting the reaction.

As indicated, the reaction is conducted at a temperature of about 40°–90°C. with a highly preferred temperature range being 55°–70°C. To this extent the temperature range is critical as conversions may suffer outside the indicated ranges. The residence or hold-up time in the continuous process is variable but may range from about 2 to 12 hours and preferably is about 4 to 6 hours for optimum results.

As pointed out above, phosphate rock per se may be employed as the main reactant mineral in the process. However, solubilized mineral forms of the rock, including monocalcium phosphate, dicalcium phosphate, tricalcium phosphate, etc. may also be employed and these are especially desirable in some cases. Mixtures of rock and one or more of these solubilized forms may also be used. It is well known, of course, that these solubilized forms may be prepared from the phosphate rock per se. In one convenient procedure for effecting conversions to a more solubilized form, there may be used aqueous hydrochloric acid with the phosphate starting material to produce a reaction mixture containing phosphoric acid, a calcium phosphate and calcium chloride. Reaction of this mixture with additional quantities of the starting phosphate then will precipitate dicalcium phosphate and thereafter, by adding limestone or lime, a suspension containing insoluble dicalcium phosphate and unreacted starting phosphate material can be obtained in a solution of calcium chloride. The solids may be separated and washed until the chloride is removed and thereafter employed in the process of the invention. To improve the economics of this process, the aqueous hydrochloric acid employed may be that obtained as a result of the formation of the $KHSO_4$ by the reaction of $KCl$ and $H_2SO_4$.

The sulfuric acid employed in conducting the reaction is preferably concentrated sulfuric acid of about 97% concentration but aqueous concentrations of about 60–98% may be used. The sulfuric acid is generally utilized in an excess of about 3 to 10 weight percent. A portion of the excess sulfuric acid may be replaced by a different mineral acid such as $H_3PO_4$ to provide hydrogen ions and reduce the level of sulfate ions. Phosphoric acid, formed in situ by reaction of the $H_2SO_4$ and the phosphate rock, is generally maintained in the reactor in the amount of about 0.05 to about 1.3 moles of $H_3PO_4$ per mole of $PO_4$ in the phosphate rock.

Any source of potassium hydrogen sulfate reactant can be employed and added as an aqueous solution of about 10–50% strength; however, it is highly preferable to employ as a source of $KHSO_4$ the reaction product of potash ($KCl$) and sulfuric acid as this product has been found to contain very low quantities of chloride. The reaction between the potassium chloride and sulfuric acid is generally conducted at a temperature of about 250° to 400°C. and the dry HCl evolved may be processed as desired such as recovery and use in the conversion of phosphate rock to a solubilized form. The resulting $KHSO_4$ product is then dissolved in water or one of the dilute recycle streams to the desired concentration.

In conducting the primary reaction of this invention, the phosphate rock or corresponding starting material is continuously charged to a reactor and the sulfuric acid, the potassium hydrogen sulfate and recycle phosphoric acid are fed to the reactor system.

The $KHSO_4$ and $H_2SO_4$ are added in a manner such that the formation of difficultly filterable salts is minimized. Thus, for every gram of starting phosphate rock added, about 0.50 to 1.0 gram of $KHSO_4$ are added. The $H_2SO_4$ is added at the rate of about 0.35 to 0.55 grams, preferably 0.45 grams, per gram of rock. On a molar basis this means that about 1.0 to 1.5 moles of sulfate ion are introduced per mole of calcium ion. With respect to the $KHSO_4$, this component is added at the rate of about 4 to 8 moles per mole of phosphate rock. It is of course to be understood that in a continuous process, substantially continuous addition of each of the reactants is carried out.

As pointed out above, the reactants and particularly the $KHSO_4$ and $H_2SO_4$, are added to the system in a manner designed to properly control the concentration gradients within the reaction system. Also as pointed out, it is preferred to add the $KHSO_4$ as an aqueous solution and preferably together with a portion of the sulfuric acid in the controlled manner.

From this reaction there are formed ions of the desired potassium phosphates contained in phosphoric acid solution together with $Ca^{++}$ and $SO_4^{=}$ which will form a crystalline calcium sulfate precipitate. Minor amounts of other ions are also present. Generally, the crystalline calcium sulfate precipitate is eliminated from the mixture as by filtration and thereafter the dedesired potassium phosphates are recovered from the mother liquor. However, both of these latter steps are quite difficult and require special procedures for effecting the separations and recovery.

After removal of the calcium sulfate as by filtration, it is then preferable to separate the potassium dihydrogen phosphate from the phosphoric acid solution and it has been found that a convenient procedure for effecting this separation is by an organic solvent treatment step. Typical organic solvents which may be used include those which are miscible with water such as the lower alkyl alcohols including methyl alcohol, ethyl alcohol, isopropanol, etc. as well as lower alkyl ketones such as acetone, methyl ethyl ketone, etc. as well as mixtures thereof. The solvent is usually employed in a weight ratio of solvent to total solution of about 0.5 : 1 to 3:1, preferably 1:1. The solvent treatment is usually carried out with agitation at a temperature of about 20°–60°C.

Treatment of the phosphoric acid solution with the organic solvent provides a means whereby the potassium dehydrogen phosphate can be caused to precipitate by addition of the organic solvent with substantially all of the phosphoric acid remaining in the solution. The organic solvent also precipitates most of the impurities present in the solution. Thus treatment by the organic solvent causes the potassium dihydrogen phosphate and any potassium sulfate present and any other impurities to precipitate and these may thereafter be recovered, preferably after washing and subsequent filtration, to produce crystals which are thereafter dried. The mother liquor containing the water, organic solvent, phosphoric acid, and small concentrations of potassium and sulfate ions from the precipitation step may then be distilled for recovery of the organic solvent. The solvent free phosphoric acid stream may then be evaporated to control the concentration in the reaction system. This water evaporation step may also be carried out prior to the solvent treatment step however.

It is pointed out with regard to the use of phosphate rock per se in the reaction, that there must then be present an excess of sulfuric acid or this must be replaced in part by other mineral acids (e.g. $HNO_3$, $H_3PO_4$, etc.) in order to provide the additional hydrogen ions necessary to drive the reaction to completion. As is commonly known in the art, an excess of sulfate ion must be present to form filterable gypsum ($CaSO_4$) crystals. If a high purity product is to be produced the excess of sulfate ion must be removed. Procedures for the removal of the sulfate ion in the product are therefore provided herein.

As described hereinabove, after completion of the reaction, a slurry is obtained which contains the desired potassium phosphate compounds in solution with the calcium sulfate salt precipitate. This mixture is then separated as described at about the reaction temperature of the system to provide the resulting solid or filter cake of insoluble calcium sulfate and a filtrate. The resulting filtrate contains the desired potassium phosphate ions in acidic aqueous solution, having a pH of about 1.4 to 1.7. This filtrate contains $H_3PO_4$, $HSO_4^-$, $H_2PO_4^-$, $H^+$, $Ca^{++}$, $K^+$ and $SO_4^=$ ions with traces of iron, aluminum and silicon and with the $HSO_4^-$ and $SO_4^=$ content being in the range of about 2.0 up to 6.0 weight percent. As mentioned above, it is preferable that a substantial amount of the sulfate ion be removed as it decreases the purity of the final product. The sulfate ion is present, of course, because of the requirement that during acidulation, excess sulfuric acid is required. Thus, it is desirable to minimize the amount of $SO_4^=$ in the filtrate product without precipitating an excessive amount of $PO_4$ as calcium phosphate and $K^+$.

A number of alternative procedures are presented by this invention for removal of the excess sulfate ion. These procedures are advantageous in that they also provide for partial neutralization of the product. According to this invention, treatment of the filtrate by the addition of a calcium-bearing material such as fresh phosphate rock or one of its solubilized forms, calcium oxide, calcium carbonate or any other calcium bearing material, alternatively or successively, has been found sufficient to remove a substantial quantity of the sulfate ion and provide optimum products. As the use of phosphate rock and/or the calcium oxide appear to provide the most advantageous results the process will be described using those materials. The CaO also may be used to neutralize the solution. Also, continuous countercurrent processing improves sulfate ion removal efficiency.

The treatment of the excess sulfate with the phosphate rock and/or other source of calcium ion such as CaO is carried out at a temperature of about 40° to 90°C. with separation of the resulting solids as by filtration also conducted at about 40° to 90°C. It has been found that a single treatment of these reagents is sufficient to remove at least about 50% of the sulfate ion present and is also sufficient to increase the pH of the solution. The ability to remove excess sulfate ion was determined by the addition of these materials in single pass batch reactors with a residence time of about six hours at a temperature of about 60° to 80°C. From these determinations the following criteria were arrived for sulfate ion removal.

It was found that 50 to 75 weight percent of the $SO_4^=$ was removed from the filtrate when it was treated with calcium containing material having the equivalent of 0.5 to 1.0 moles and preferably 0.7 moles of calcium ion per mole of $SO_4^=$ in the filtrate. The process was more efficient in percentage reduction of the $SO_4^=$ as the level of sulfate in the filtrate increased. For example, treatment of filtrate containing 3 mole percent of $SO_4^=$ reduced the sulfate level by 50%, while a filtrate containing 6 mole percent of $SO_4^=$ was treated and the sulfate level was reduced by 75%. The calcium ion was supplied from any calcium containing material including tricalcium, dicalcium, or monocalcium phosphate, calcium oxide and phosphate rock or any combination thereof.

During these batch determinations, it was noted that the highest pH for the solution that could be obtained using the phosphate rock, tricalcium phosphate, dicalcium phosphate or monocalcium phosphate was about 2.2, 3.0, 2.5 and 1.75, respectively. Thus, while these reagents can be used to substantially reduce the $SO_4^=$ in the filtrate, they are not sufficient to neutralize to the most preferred high pH value.

It was discovered, however, that by treating the filtrate with calcium oxide (CaO) under the same conditions in amounts up to about 0.7 mole of $Ca^{++}$ in the CaO per mole of $SO_4^=$ in the filtrate, the weight percent of the $SO_4^=$ in the filtrate decreased about 75 weight percent. At this point the pH of the filtrate was about 2.6. As the CaO was further increased however, the pH increased and the amount of $SO_4^=$ remaining in solution increased due to the preferential precipitation of basic calcium phosphates at high pH values leaving the $SO_4^=$ in solution. For example, at 10 grams of CaO per 100 grams of filtrate, the pH of the resulting mixture was 6.4, about 98 weight % of the $SO_4^=$ remained in solution and about 75 weight percent of the $PO_4$ was removed. Thus, the CaO can be used to neutralize as well as to remove $SO_4^=$ from the filtrate but the amount added in each successive treatment is critical.

Also, the weight ratio of $K^+/PO_4^=$ in the filtrate can be controlled by the amount of CaO added.

It was also determined that treatment of the filtrate or product solution with fresh phosphate rock provides an advantageous procedure, particularly in a continuous operation as it provides a means of lowering the sulfate ion content of the solution by allowing the sulfate to react with the calcium content of the rock and the rock residue can be recovered and recycled to the main reaction system. To improve the efficiency of this rock treatment step and make the solution more receptive to sulfate ion removal, additional hydrogen ion such as derived from a mineral acid, e.g. nitric acid, phosphoric acid, etc. can be added. Therefore, use of fresh rock with the subsequent addition of calcium oxide is particularly beneficial in the system and represents a most preferred procedure.

After treatment with any of these materials, the solids are removed and may be cycled to the attack tank; the resulting solution may then be processed as subsequently described to provide the desired products.

According to this invention the reaction product can be treated in one or more stages to reduce the sulfate ion content to a desired level.

The process of the invention also provides a procedure for treating any excess phosphoric acid produced in the process with a calcium bearing material such as CaO, to neutralize the $H_3PO_4$ prior to recycling to the attack tank. This eliminates the need to remove any net production of the $H_3PO_4$ from the system.

The process also provides alternative novel processing procedures for obtaining solid products, polymerized solid products and solution products of either N-P-K or K-P fertilizers. These aspects are illustrated in the drawing in FIGS. II, III, IV, VA, VB and VI. These procedures include neutralization of the product with a base such as CaO and/or $NH_3$, so that the resulting product contains both $KH_2PO_4$ and $K_2HPO_4$ as well as nitrogen values.

As pointed out above, the process of this invention is eminently suitable for use in a continuous operation and in the drawings accompanying this invention, there is provided such a continuous procedure which provides a workable and economically feasible continuous system for practicing the process of the invention.

In the accompanying drawings, it will be seen that a schematic outline of a continuous process encompassing a preferred procedure for conducting the reaction is illustrated in FIG. I. Certain of the alternative procedures are also illustrated in FIG. I. FIGS. II, III, IV, V and VI show alternative product recovery procedures. It is to be understood that various stirrers, pumps, fuel sources, etc. used in conducting the process, are to be included in the operation as they are obvious and known to those skilled in the art. Also it is to be understood that blocks in the Figures labeled as reactors, separators, etc. may actually consist of one or more vessels or a series of reactors, separators, etc. for each location.

Referring now to FIG. I of the drawing it will be seen initially that $KHSO_4$ is formed by the addition of potash and sulfuric acid through lines 1 and 2, respectively, to reactor 3 maintained at a temperature of about 250° to 400°C. wherein the two materials interact to form potassium hydrogen sulfate for use in the reaction. The dry hydrogen chloride formed is removed by line 4 from the reactor for disposal or use as desired, e.g. in conversion of phosphate rock to a solubilized form.

The resulting potassium hydrogen sulfate with some $H_2SO_4$ is passed through line 5, after mixing with water from line 6, to tank 7 to form an aqueous solution of about 10–50% by weight of $KHSO_4$. This aqueous solution is then fed through line 8 at a controlled rate into the reactor 9, which may, of course, be a series of reactors, such as A, B and C, with slurry recycle. The reactors are maintained at a temperature of about 40°–90°C. and provided with means for agitation.

Concentrated sulfuric acid is introduced into reactor(s) 9 through line 10, while simultaneously, fresh phosphate rock, or one of the solubilized forms, is introduced through line 11 for reaction with the sulfuric acid and $KHSO_4$.

In the basic process, the amounts of phosphate rock, $KHSO_4$ and $H_2SO_4$ fed to the reactor are stoichiometrically determined so that the desired ratio in the product of $K^+$ to $PO_4^=$ will be established between the $KHSO_4$ and phosphate rock (as analyzed), and so that the $Ca^{++}$ from the phosphate rock and the $SO_4^=$ from the $KHSO_4$ and $H_2SO_4$ will react to produce gypsum. It has been found that about a 3 to 10% excess of $H_2SO_4$ is required in the reaction based on the stoichiometric quantity of $SO_4^=$.

In the reactor 9 the reactants are intimately contacted at the preferred temperature of about 40°–90°C. In the continuous system using the series of reactors A, B and C, a slurry of the reacting mixture is generally continuously recycled from the last reactor to the first or intermediate reactors as by lines 12 and 12', these being optional procedures but important to obtain filterable $CaSO_4$ crystals.

The reacting slurry is then removed from the reactor(s) 9 by line 13 and passed to filter 14, or analogous preferably multi-stage separator as illustrated, such as a centrifuge, where the calcium sulfate crystals are filtered off and removed through line 15. The filter cake is continuously washed with wash water introduced through line 16 and recycled via line 18. Strong wash water is recycled to the reactor(s) 9 through line 17 and forms a slurry with the entering rock.

The filtrate removed from filter 14 by line 19 is sometimes too high in sulfate ion content and at this point, may be further processed to lower the sulfate ion content to a level desired in the final product. Alternatively, if the filtrate is satisfactory as to sulfate ion content it may be sent directly via line 19 to further processing procedures as described hereinafter.

However, in one embodiment, for sulfate reduction, the filtrate is passed via line 19' to a treatment tank or reactor 20 where it is treated with fresh phosphate rock and/or calcium oxide or other calcium-bearing material at a temperature of about 40°–90°C. with agitation of the mixture. If desired, a source of hydrogen ions such as from phosphoric acid, nitric acid, etc. can be added to the reaction mixture to facilitate solubilization of the calcium in the rock for reaction with $SO_4^=$ ions. 0.7:1.

In this embodiment as illustrated in FIG. I, the sulfate content in the feed stream removed from the separation system 14 is treated to reduce the sulfate content prior to further processing. In this embodiment the product in line 19, coming from filter 14, being rather high in sulfate content, is sent via dotted line 19' (the dotted line being used to represent an alternative embodiment) to a reactor 20 where it is reacted with phosphate rock and/or CaO which serve to reduce the sulfate content and also partially neutralize the mixture when CaO is used. In the embodiment shown CaO is added to reactor 20 via line 21. In preferred embodiments, sufficient CaO is added to provide a molar ratio of $CaO/H_2SO_4$ in the system of about 0.5:1 up to 1:1, respectively. A preferred ratio is about 0.7: 1.

Prior to, or in place of the CaO addition, there may be added a quantity of phosphate rock, or other calcium-bearing phosphate, via line 22 to effect sulfate reduction in reactor 20. In the reactor 20, agitation is provided at a temperature of about 40°–90°C., preferably about 60°–75°C., for a residence time of about ½ to 4 hours, preferably in the range of 2 to 3 hours. This step will generally reduce the sulfate content by about 30% to 60% by weight.

After contact in reactor 20, the slurry is passed by line 23 to separator 24, (e.g. a filter, centrifuge, combination, etc.) where a precipitated gypsum cake ($CaSO_4$) is removed by line 26 and may be discarded or recycled to main reactor 9 via line 25.

After separation is effected in separator 24, the resulting filtrate is then passed via line 27 to evaporator 28.

In the alternative aspect, if the sulfate ion content is satisfactory, either because of end product use or otherwise, the system of reactor 20 can be by-passed and the filtrate from filter 14 can be sent directly to evaporator 28 via line 19.

In this embodiment as shown in FIG. I, the filtrate containing the product is passed to evaporator 28 where a sufficient amount of the water is evaporated off through line 29 to provide a solids content of greater than about 40% by weight and preferably about 40 to 70% by weight. The resulting stream from the evaporator 28 is then taken off through line 30 and passed to the solvent treatment step. This feed stream contains primarily potassium ions and phosphate ions with some sulfate ions and a small amount of calcium ions present.

This feed stream is then passed to agitated mixing vessel 31 for treatment by solvent introduced through line 32 from solvent storage 33. The solvent employed in this step may be any of the lower alkyl alcohols or lower alkyl ketones, but it is preferred to use either acetone or methanol in the solvent treatment step. The solvent treatment is conducted at about room temperature (i.e. 20°–60°C.) with contact time varying from about 5 to 30 minutes. The amount of solvent used ranges from about 0.5:1 up to about 3:1 based on the weight of solvent per total weight of the feed stream coming from the evaporator.

After treatment by the solvent the resulting mixture is passed to separator 34 by line 35 where precipitated solids are separated in the separator (e.g. a filter, centrifuge or combination, etc.) and removed through line 38. Fresh solvent is introduced as wash into the separator 34 by line 32', recycled to separator 34 as an intermediate wash through line 36, and finally the strong wash is recycled through line 37 to the solvent treatment reactor 31.

The wet solid product removed from the separator by line 38 is sent to a solvent recovery step 39 for removal of the remainder of the solvent, this being merely a stripping step. The solvent is thus recovered and recycled to the solvent still 40 by line 41. There is then recovered by line 42 a solid product containing primarily potassium phosphates with some sulfate depending on the sulfate treatment steps described above.

The bulk of the solvent recovered in separator 34 is removed through line 43 and passed to solvent still 40.

In solvent still 40 the recovered solvent streams are distilled with solvent recovered therefrom removed by line 44 and sent to solvent storage 33 for further use.

From the solvent recovery step there is obtained as bottoms an aqueous solution of phosphoric acid containing minor amounts of potassium and sulfate ions which can provide phosphoric acid for any continuous recycle needed to maintain the $H^+$ concentration level or high phosphate level depending upon the requirements of the reaction system and for any net production of acid for a by-product stream for ultimate sale or use. The recycle $H_3PO_4$ stream is returned by line 45 to the main reactor. In a separate embodiment, the net $H_3PO_4$ product is removed from the system through line 46' as a by-product stream.

A further embodiment for elimination of the phosphoric acid product stream is also disclosed whereby the $H_3PO_4$ stream is neutralized with CaO and the resulting calcium phosphate is returned to the attack reactor 9 thus resulting in a reduction of the phosphate rock fed to the attack tank.

Thus, the phosphoric acid stream from line 45 is sent to agitated reactor 47 by line 46 where it is treated with calcium oxide added through line 48. About 0.5 to 1.5 moles of CaO are added per mole of $H_3PO_4$ present in the stream. A 1:1 molar ratio is preferred. Reactor 47 is operated at about ambient temperature with about a 5 to 30 minute hold-up period.

After this reaction, the resulting mixture may be treated in either of three ways. In one procedure, the mixture or slurry is removed from the reactor 47 through line 49, and by line 50, is merely recycled to the main or acidulation reactor 9. In an alternative procedure, the mixture in line 49 is sent to separator 51 where solids and liquids are separated as by filtration. The solid materials are then recycled by line 52 to the main reactor 9 for further acidulation. This solid material in line 52 comprises a calcium hydrogen phosphate of the formula $Ca_x H_y(PO_4)_z$, where $x$, $y$ and $z$ are numbers, including fractional numbers, but the extract composition of this material is not precisely known. Meanwhile the filtrate, which is primarily water, is removed from the filter 51 by line 53 and this filtrate is preferably recycled by line 53 for use as water in formation of the $KHSO_4$ solution in vessel 7. Hence, the cycle is continuous. In the third alternative the by-product calcium hydrogen phosphate stream can be removed from the system by line 52' rather than cycling to the main reactor.

FIGS. II, III, IV, VA, VB and VI relate to alternative procedures for recovering and working up the solid cake product recovered and identified in FIG. I as Product A, or other feed streams from FIG. I, in order to provide this product in a form suitable for either a solid or solution consumer fertilizer of high plant food content. Thus, the processes described herein may be considered to be extensions of the cyclic process of FIG. I and covering alternative procedures for preparation of the product in final form depending on the needs of the consumer. Product A, may, of course, be prepared by any of the alternative routes of FIG. I.

Referring to FIG. II, product A from FIG. I may be fed directly to a polymerization unit 75' through line 42' to produce Product C, a polymerized material with an $N-P_2O_5-K_2O$, abbreviated N-P-K, ratio of 0-2-1. In the polymerization unit, the product is polymerized under the firing conditions described in parent Application Ser. No. 755,699, filed Aug. 27, 1968, to provide products of the type described in that application.

In an alternative procedure, Product A is dissolved in mixing vessel 54 with 50 to 150 weight percent of water introduced through line 55. This mixture is then passed through line 56 to a separator where undissolved materials are removed from the system, recycled to reactor 9 in FIG. I through line 58 or recycled to sulfate reduction reactor 20. The filtrate is removed through line 59 and treated by either of two procedures.

In the first alternative, the filtrate in line 59 is taken through lines 60 to an evaporator 61 where, as by distillation, the solution is concentrated with water removed through line 62. The resulting concentrated liquor exits through lines 69 and 69' and can be sold as a solution fertilizer Product D with an N-P-K ratio of 0-2-1. Alternatively, Product D can be passed by line 69 to drier 70 where the remainder of the water is removed by line 71 by drying at an elevated temperature, e.g. about 75° to 200°C. After drying, solid Product B is recovered from line 72 having an N-P-K ratio of 0-2-1.

In the second alternative, the filtrate from line 59 is taken through line 59' and treated in a neutralization vessel 63 with CaO introduced through line 64. The neutralized material is removed through line 65 to a separator where solids are removed and recycled to reactor 9 through lines 67 and 58. The filtrate is taken through line 68 to evaporator 61 and drier 70 as described above and results in product B', a solid material with an N-P-K ratio of 0-1-1. The concentrated solution in line 69 can also be removed through line 69' and sold as a solution Product D' with an N-P-K ratio of 0-1-1.

Alternatively the filtrate in line 68 can be routed through the evaporator 73 where water is removed through line 74 as by distillation and then to the polymerizer 75 via line 68' wherein a polymer Product C' is produced and recovered through line 77 with an N-P-K ratio of 0-1-1. The polymerization reaction is conducted as described in aforementioned co-pending Application Ser. No. 755,699, that is by firing in a kiln to a temperature of about 250°–850°C.

It is obvious that the filtrate stream 59 from separator 57 can be split into various proportions through lines 59' and 60 to produce both N-P-K ratios 0-2-1 (line 60) and 0-1-1 (line 68). These streams are combined in the evaporator 61 and the resulting concentrate will have N-P-K ratios varying between 0-2-1 and 0-1-1 depending on the amounts of each solution fed through lines 60 and 68.

In FIG. III there is set forth a different and alternative procedure for working up or recovering Product A, this procedure providing a means whereby nitrogen values can be introduced to the system.

In this procedure solid Product A is fed through line 78 to solution tank 79 where it is admixed with about 50 to 150 weight percent or more of water with agitation, the water being introduced through line 80. Preferably an equal amount by weight of water, based on the weight of the solids present, is used. The resulting solution is then removed through line 81 and then worked up by either of two different procedures both of which provide nitrogen values.

In one procedure the solution in line 81 is passed into mixing tank 82 provided with agitation, where there is introduced sufficient nitrogen food values in the product. In this aspect, $NH_3$, together with urea or $NH_4NO_3$, or mixtures thereof, may be added in line 83 to provide the nitrogen values. Preferably in this aspect, there is introduced about 0.5 to 3% by weight of $NH_3$ to neutralize the solution based on the solids weight of stream 81 and sufficient urea and/or $NH_4NO_3$ to provide the desired nitrogen values, i.e., up to 20 to 30 weight percent. Preferably, about 1.0% by weight of ammonia is added. Thus, amounts of ammonia, urea and/or $NH_4NO_3$ can be added to produce an N-P-K ratio of 1-2-1 in the solution Product E. In this case, the actual weight percents of the plant food values would be about 15-30-15. The resulting mixture is removed by line 95 and sent to separator 96 which can be multi-stage filter or centrifuge where the liquid and solids are separated. The solids are removed and recycled by line 97 to main reactor 9 for further reaction in the main process. The filtrate from separator 96 is removed by line 98 as a solution Product E. Alternatively while the wet cake stream 97 from evaporator 96 can be recycled to reactor 9 of FIG. I, it can also be dried and sold as a by-product material high in plant food values.

In the alternative procedure, the aqueous solution in line 81 is taken off through line 84 and processed to adjust the potassium to phosphorus ratio in the product. In this alternative the solution is initially sent to separator 85, which can be a filter or centrifuge, preferably a multi-stage filter, where any solids are removed by line 86 and recycled to main reactor 9 by line 86 for further reaction. The filtrate is removed from separator 85 by line 87 and sent to an agitated neutralization tank 90 for neutralization and thus adjustment of potassium and phosphorus ratios as well as the addition of nitrogen values by the addition of ammonia, urea and/or $NH_4NO_3$ in the manner described with respect to line 83. These reactions are conducted at room temperature and atmospheric pressure although temperatures of 20° to 60°C. can be used. In this tank 90, about 5 to 15 weight percent of calcium oxide or equivalent calcium material such as calcium carbonate or calcium hydroxide, is added to the mixture together with about 0.5 to 3% of the nitrogen values. The additions may be concurrent or alternative. At this point the mixture, now neutralized, will then contain both potassium monohydrogen phosphate and potassium dihydrogen phosphate as well as nitrogen values. The resulting neutralized solution is then removed by line 91 and sent to separator 92 where any solids present are removed as a wet cake and recycled to the main reactor 9 for further reaction by line 93. Alternatively, this wet cake can be dried and sold as a by-product high in plant food values. The filtrate is taken off through line 94 and recovered as solution Product E' which has a N-P-K ratio of 1-1-1. By actual weight percent, the plant food values are about 15-15-15.

In FIG. III, it is also feasible to neutralize the excess sulfate ion in neutralization tank 82 and/or 90 with a material which would add additional fertilizer nutrients to the solution. Thus the mixture or a portion thereof can be neutralized with other materials such as magnesium oxide, or salts of zinc, copper, iron, etc. or any other material useful to provide valuable minor micro-nutrients to the soil.

The process of FIG. IV describes a solvent treatment section in detail and also provides an alternative procedure for working up the filtrate-containing product recovered from the main reactor 9. In this procedure the filtrate may be initially subjected to sulfate reduction procedures as described in FIG. I or forwarded directly from the separation step. In this procedure, the filtrate or mixture from the last reactor is passed via line 99 to recycle tank 100 where it is mixed, if desired, with calcium phosphate solids from a subsequent sulfate reduction step in line 109'. The resulting mixture is removed by line 101 and sent to separator 102, such as a multi-stage filter, where the calcium sulfate is removed and discarded through line 103. The resulting filtrate is sent by line 104 to agitated reaction tank 105 where calcium oxide, or other calcium-bearing material such as calcium carbonate or calcium hydroxide in an amount of about 5 to 15 weight percent is added through line 106. This is essentially the same procedure as described for FIG. I and reactor 20. The resulting product is then passed to separator 108 where solids are removed. These recovered solids are primarily dicalcium phosphate and may be recycled by line 109 and 109' to the recycle mix tank 100, recycled to sulfate-reduction reactor 20, recycled to main reactor 9 by line 110 or removed by line 110' as a by-product stream and sold as dicalcium phosphate.

The filtrate from separator 108 is removed by line 111 and sent to a solvent treatment step in solvent treat tank 112. Solvent, either a lower alkyl alcohol such as methanol, or a lower alkyl ketone such as acetone, as described above, is introduced through line 113 from solvent storage 114. The hold up time in the solvent treatment tank is about 5 to 30 minutes and it is maintained at a temperature of about 20°-60°C., preferably room temperature. The amount of solvent added is about an equal weight based on the solids content of line 111 as described above. The resulting mixture is removed through line 115 and sent to separator 116 to separate solids from the filtrate. Additional fresh solvent is added to the separator by line 113' to effect complete washing of the solids. The solvent filtrate is taken off by line 117 and sent to still 118 for removal of the solvent by distillation. The recovered solvent is passed by line 119 to solvent storage 114 for reuse. A weak solvent wash stream 120 is recycled in separator 116 and a strong solvent wash stream is continuously recycled to solvent treat tank 112 by line 120'. The bottoms from the solvent still 118 are taken off through line 128 and sent to evaporator 130 where water is removed as by distillation by line 132 and where it may then be treated in one of two ways. In one procedure most of the liquid is removed in the evaporator and the resulting concentrate is passed by line 129 to drier 131 where the remainder of the water is removed by line 134, to provide solid Product F'. Drying is conducted at a temperature of about 100°-200°C. to provide a low sulfate solid K-P fertilizer Product F'.

In the second procedure only a portion of the water is removed by evaporator 130, e.g. about 10 to 50 percent of the liquid, primarily water, to provide a solution product in line 133. This solution Product F contains potassium phosphate values and is low in sulfate.

Referring back to separator 116, the wet cake therein is removed from the separator via line 121 to solvent recovery 122 where solvent is removed as by evaporation through line 123 at a temperature of 100°-200°C. for return to solvent storage 114 to provide a solid product. This solid cake is then removed through line 124 for polymerization in kiln 125 at about 250°-850°C. as described in Fig. III and in co-pending Application Ser. No. 755,699, the water being removed through line 126. There is then recovered in line 127 solid Product G containing high values of potassium and phosphate as determined by the $K_2O/P_2O_5$ ratio.

Products F, F' and G can vary in $N-P_2O_5-K_2O$ ratios from 0-2-1 to 0-1-2.5 depending upon the amount of CaO used in reaction tank 112. Product G usually contains more sulfate than Products F and F'.

FIGS. V-A and V-B represent methods of producing ammonium phosphate as a primary by-product stream by starting with the filtrate from reactor 20 in FIG. I (line 27) as illustrated in FIG. V-A or starting with solid Product A (FIG. I) as shown in FIG. V-B.

In FIG. V-A, the filtrate from reactor 20 in FIG. I is passed to neutralization tank 137 via line 136 where sufficient ammonia is added through line 138 to adjust the pH of the solution to the range of about 10.5 to 11.0. The ammonia is preferably added as gaseous ammonia. After neutralization, the resulting mixture is removed by line 139 to separator 140 where solid by-product ammonium phosphate is removed through line 141. This product results from the relatively high pH produced in the neutralization step.

The filtrate from the separator is removed by line 142 to ammonia stripper 143 where the ammonia is stripped off and recycled via line 144 to line 138 for reuse.

After the ammonia is removed the resulting filtrate is passed through line 145 to evaporator 146 where water is removed as by distillation through line 147. At this point, sufficient water is removed to provide N-P-K solution Product H of the desired concentration or most of the water is removed and the concentrate is passed by line 149 to drier or polymerizer 150 where the remainder of the water is removed through line 151. If it is preferred to dry the solids at a temperature of about 100°-200°C., there results a solid N-P-K dry Product I from line 152. On the other hand, if a polymerized product is desired, firing at a temperature of about 250°-850°C. as described in co-pending Application Ser. No. 755,699, provides a polymerized N-P-K Product I. The main products H or I have an $N-P_2O_5-K_2O$ weight percent ratio of about 1-18-18.

Referring now to FIG. V-B, there is illustrated a method for providing Product A in a form suitable for use in the process of FIG. V-A. Thus in this embodiment, Product A is passed via line 153 to solution tank 154 where the solid is dissolved in sufficient water to solubilize from line 155. The resulting solution is passed by line 156 to separator 157 where insolubles are removed to main reactor 9 by line 158. The filtrate is then removed through line 159 for use in the process of FIG. V-A.

Referring to FIG. VI, it will be seen that this figure represents methods of producing granular products high in nitrogen values starting with either the filtrate from FIG. I, lines 19 or 27 (Feed A) which have a $P_2O_5$ to $K_2O$ ratio of about 2:1, or starting with the adjusted filtrate from FIG. II, line 68 (Feed B) which has a $P_2O_5$ to $K_2O$ ratio of 1:1. With the addition of nitrogen values in the form of $NH_3$, $NH_4NO_3$ and/or urea, high nitrogen products can be produced with $N-P_2O_5-K_2O$ weight percent values of about 25-20-10, represented as Product J from feed (A), or 25-17-17, represented as Product J' from feed (B).

Thus in FIG. VI, the filtrate starting material A (from FIG. I, lines 19 or 27), or B (from FIG. II, line 68) is introduced by line 160 to evaporator 161 where water is evaporated and removed by line 162 as by distillation to provide a concentrated product. Preferably about 20 to 50 weight percent of the water is removed. The resulting concentrate is removed to reactor 164 for the addition of nitrogen values. The nitrogen values may be added in the form of ammonia via line 165 and/or NH₄NO₃ or urea via line 166. Sufficient nitrogen values are added to provide a final product having an N-P-K weight percent ratio of about 25-20-10 (feed A) or 25-17-17 (feed B). These nitrogen values are added at about room temperature and with agitation. The resulting slurry is removed through line 167 to conventional granulator 168 where water is removed via line 169. The resulting granulated products are then removed via line 170 as granular Products J and J' for feeds (A) and (B).

It will thus be seen that the alternative procedures set forth in FIGS. II to VI provide distinctly different, but clearly advantageous continuous procedures for working-up the products from FIG. I into economically useful fertilizer products.

Quite obviously, these processes may be varied in many respects. For example, there may be included in the basic process a procedure for conversion of the phosphate rock to one of its solubilized forms by the reaction with hydrochloric acid as described herein. In addition, if it is desired not to employ the organic solvent treatment step, working up the final product may merely comprise concentration and crystallization of the filtrate solution in a crystallizer followed by a separation as in a filter and washing and drying the final product with recycle of the mother liquor which is primarily phosphoric acid.

The following examples are presented to illustrate the process of the invention but are not to be considered as limitative thereof.

In the examples, the system set forth on the drawing accompanying this application was employed in practicing the process in a continuous manner. In the examples, separate runs were made with two and three reactors in series employed in order to show these embodiments. In Examples I to XI the resulting filtrates were not subjected to the treatment steps to lower the sulfate ion content.

In the reaction sufficient excess phosphate rock and sulfuric acid were used to provide 3 moles of $H_3PO_4$ in the reaction. In these runs, both the slurry and circulated filter wash water was recycled except where noted.

The results of the experiments are set forth in the following Table I, which table states the feed rates of starting materials, reaction conditions and analyses of the products obtained.

From the data given in Table I, it will be seen that $PO_4$ conversions for these runs are consistently at 90% and above thus demonstrating the efficiency of the reaction. It will also be noted, however, that $SO_4^=$ content in the filtrate ranges from about 3.5 to 6.0 wt. %.

In these runs the product was recovered by concentration of the resulting filtrate to a weight percent of product of about 40%. Thereafter the product was precipitated by the addition of an equal volume of organic solvent. In Examples I-V the organic solvent was methyl alcohol whereas in Examples VI-XI, the precipitation solvent was acetone. As will be observed, product recovery was excellent in all runs.

TABLE I

| EXAMPLE NO. | Rock Feed Rate gm/min | Rock¹ Used | Wt $H_2SO_4$ / Wt Rock | Wt $KHSO_4$ / Wt Rock | Initial H ion Content Wt $H^+$/Wt Rock | Moles $SO_4$ / Moles Ca | Reactor Temperature (°C) | | |
|---|---|---|---|---|---|---|---|---|---|
| | | | | | | | I | II | III |
| I | 10.18 | A | 0.441 | 0.703 | 0.0143 | 1.124 | 33 | 77 | 80 |
| II | 10.18 | A | 0.442 | 0.720 | 0.0145 | 1.084 | 32 | 73 | 79 |
| III | 10.18 | A | 0.442 | — | 0.0146 | 1.155 | 33 | 58 | 58 |
| IV | 10.18 | A | 0.456 | 0.631 | 0.0139 | 1.073 | 33 | 90 | 90 |
| V | 10.18 | B | 0.426 | 0.688 | 0.0137 | 1.078 | 80 | 80 | 80 |
| VI² | 10.18 | B | 0.428 | 0.725 | 0.0139 | 1.099 | 78 | 80 | 80 |
| VII | 10.18 | B | 0.396 | 0.713 | 0.0131 | 1.046 | 62 | 63 | 64 |
| VIII | 10.18 | B | 0.346 | 0.690 | 0.0119 | 0.969 | 64 | 67 | 67 |
| IX³ | 10.18 | B | 0.503 | 0.846 | 0.0163 | 1.288 | 60 | 77 | 83 |
| X | 10.18 | C | 0.373 | 0.690 | 0.0128 | 1.071 | 60 | 60 | 63 |
| XI | 10.18 | B | 0.410 | 0.717 | 0.01374 | 1.102 | 40 | 44 | 45 |

| EXAMPLE NO. | Space Velocity gm/hr. cc. | | $PO_4$ Conversion (Based on Filter Cake Analysis) | Wt % of $SO_4$ in Filtrate Product | Wt % of K Recovered in Filtrate Product | Overall Wt. Loss (%) | Wt % H Ion in Filtrate |
|---|---|---|---|---|---|---|---|
| | With Filtrate Recycle Using 3 Reactors | Without Filtrate Recycle Using 2 Reactors | | | | | |
| I | 0.249 | 0.178 | 94.0 | 4.94 | 93.6 | 6.2 | 0.0896 |
| II | 0.247 | 0.180 | 94.4 | 5.13 | 94.4 | 4.80 | 0.0888 |
| III | 0.227 | 0.182 | 97.8 | 5.15 | 93.6 | 3.13 | 0.0904 |
| IV | 0.249 | 0.175 | 91.9 | 5.20 | 92.1 | 8.88 | 0.0968 |
| V | 0.205 | 0.180 | 94.2 | 5.26 | 92.7 | 6.42 | 0.096 |
| VI² | 0.221 | 0.183 | 88.7 | 4.81 | 91.9 | 6.59 | 0.0784 |
| VII | 0.205 | 0.176 | 97.1 | 5.38 | 97.1 | 6.04 | 0.0928 |
| VIII | 0.198 | 0.170 | 92.9 | 3.96 | 88.8 | 6.46 | 0.0728 |
| IX³ | 0.176 | 0.142 | 96.3 | 5.13 | 66.0 | 9.62 | 0.169 |
| X | 0.197 | 0.162 | 92.3 | 4.35 | 93.7 | 4.13 | 0.0770 |
| XI | 0.200 | 0.175 | 97.0 | 3.86 | 91.4 | 5.78 | 0.084 |

Notes: (1) Rocks: (A) Size — 60% through 200 mesh; Analysis — Ca — 34.54 Wt. %, $PO_4$ — 43.07 Wt. %.
(B) Size — 60% through 200 mesh; Analysis — Ca — 34.79 Wt. %, $PO_4$ — 43.24 Wt. %.
(C) Size — 80–90% through 200 mesh; Analysis — Ca — 33.21 Wt. %, $PO_4$ — 43.48 Wt. %.
(2) $H_2SO_4$ fed into Reactor No. 1 instead of No. II for this run.
(3) Wt. % ions in Filtrate was 20–22, except for Run IX which was about 27 Wt. %.

EXAMPLE XII

This example illustrates the effect of the procedure of reactor 20 in FIG. I in treatment of the filtrate stream with lime (Calcium Oxide) only. In this reactor, treatment with the CaO was conducted at 75°C. and atmospheric pressure. The effect of the reactor in this portion of the process is illustrated by indicating the amount by weight of ions of solids present in each aqueous stream. Thus, the effect of the CaO on the stream can be determined by comparing the ions in the incoming stream with the ions present in the out-going stream. The CaO treatment served to reduce the sulfate ion content. In this example the filtrate stream was contacted with calcium oxide in a molar ratio of CaO/$H_3PO_4$ of 0.55:1, respectively. In the following table the particular stream is identified with relation to the line number or reactor number in FIG. I.

| Solids Composition | Input, Gms. | | |
|---|---|---|---|
| | Filtrate 19 | CaO 21 | Total |
| Ca | 2.48 | 17.99 | 20.47 |
| K | 24.37 | — | 24.37 |
| $SO_4$ | 6.91 | — | 6.91 |
| $PO_4$ | 78.12 | — | 78.12 |
| Total | 111.88 | 17.99 | 129.87 |

| Solids Composition | Output, Gms. | | |
|---|---|---|---|
| | Filtrate 27 | Recycle 25 | Total |
| Ca | .04 | 24.52 | 24.56 |
| K | 21.02 | 4.13 | 25.15 |
| $SO_4$ | 4.57 | 2.21 | 6.78 |
| $PO_4$ | 30.40 | 56.37 | 86.77 |
| Total | 56.03 | 87.23 | 143.26 |

In comparing the input stream 19' with the outcoming stream 27, it will be noted that the $SO_4^=$ content was reduced by about 2.5 weight percent, thus illustrating the effectiveness of the calcium oxide treatment.

EXAMPLE XIII

This example illustrates in two different runs, the effects of the solvent treatment step of FIG. I and shows the effect of the solvent treatment step when the calcium oxide treatment or rock treatment in reactor 20 is employed and when the reaction system for sulfate reduction is bypassed and the filtrate is sent straight to the evaporator 28 via line 19. In each case the solvent treatment is conducted at room temperature in an agitated vessel to effect a good precipitation. Contact times were from 5 to 30 minutes.

A. In the first run, the effect of the solvent treatment step is illustrated when reactor 20 is bypassed and the filtrate is the aqueous stream coming from evaporator 28. Thus, in this case the feed stream is the feed passing through line 30 to the solvent treatment step. In the first portion of this example, runs are illustrated using acetone to feed solids ratios of 2.5:1 and in the second portion, the extracting solvent is methanol and a methanol to feed solids ratio of 1:1 is used. The reactants and results of these runs are as follows:

| Solids Composition | Feed Stream Gms. | Product Stream, Gms. | | |
|---|---|---|---|---|
| | | 30 | Filtrate 45 | Cake 42 | Total |
| (1) Ca | | .30 | 0.0 | .30 | .30 |
| K | | 9.02 | .27 | 8.75 | 9.02 |
| $SO_4$ | | 6.66 | .10 | 6.98 | 7.08 |
| $PO_4$ | | 24.22 | 10.63 | 13.71 | 24.34 |
| Total Wt. | | 40.20 | 11.00 | 29.74 | 40.74 |
| (2) Ca | | .13 | 0.0 | .02 | .02 |
| K | | 5.52 | 1.18 | 4.13 | 5.31 |
| $SO_4$ | | 4.29 | 0.15 | 4.55 | 4.70 |
| $PO_4$ | | 16.98 | 13.83 | 2.78 | 16.61 |

-continued

| Solids Composition | Feed Stream Gms. 30 | Product Stream, Gms. | | |
|---|---|---|---|---|
| | | Filtrate 45 | Cake 42 | Total |
| Total Wt. | 26.92 | 15.16 | 11.48 | 26.64 |

In reviewing the results of the above solvent treatment steps, it will be seen that substantially complete precipitation of the useful ions present is achieved (Compare streams 30 and 45). Also, stream 45, comprising primarily $H_3PO_4$, is recycled for further reaction. B. In this second section of the example, the solvent treatment step is carried out on the filtrate after it has been subjected to sulfate ion reduction in reactor 20. Thus, the feed is that coming from line 27 in FIG. I to the evaporator 28 and then by line 30 to the solvent treatment step. The conditions for solvent treatment are the same as in Example XIII-A. In the first portion of this experiment, the acetone to feed solids weight ratio was 1.75:1, whereas, in the second portion, the methanol to feed solids weight ratio was 1.35:1. The data for these runs are as follows:

| Solids Composition | Feed Stream Gms. 30 | Product Stream Gms. | | |
|---|---|---|---|---|
| | | Filtrate 45 | Cake 42 | Total |
| (1) Ca | .98 | 0.0 | .98 | .98 |
| K | 9.34 | .42 | 9.49 | 9.91 |
| $SO_4$ | 2.74 | .03 | 3.06 | 3.09 |
| $PO_4$ | 32.08 | 9.72 | 23.29 | 33.01 |
| Total Wt. | 45.14 | 10.17 | 36.82 | 46.99 |
| (2) Ca | <.10 | 0.0 | .03 | .03 |
| K | 5.82 | 1.20 | 4.33 | 5.53 |
| $SO_4$ | 1.43 | .03 | 1.45 | 1.48 |
| $PO_4$ | 8.39 | 1.30 | 7.37 | 8.67 |
| Total Wt. | 15.64 | 2.53 | 13.18 | 15.71 |

In reviewing the results of this latter solvent treatment section it will again be noted that substantially complete precipitation of the useful ions is obtained. The low percentage of sulfate ion in this feed stream and cakes should be noted particularly as compared to Run A. Recycle stream 45 contains only substantially phosphoric acid.

EXAMPLE XIV

In this example there is illustrated treatment of the phosphoric acid stream recovered from solvent still 40 and removal from the system as shown in FIG. I by line 46 for treatment by calcium oxide and recycle to the main reactors. In these treatment sections, the calcium oxide was added by line 48 to reactor 47 and the CaO and phosphoric acid stream were reacted at 75°C. in a calcium oxide/phosphoric acid ratio by moles of 1.06:1. The ions present in these streams and the final product are as follows:

| Solids Composition | Input Gms. | | |
|---|---|---|---|
| | Still Bottoms 46 | CaO 48 | Total |
| Ca | — | 27.76 | 27.76 |
| K | 1.85 | — | 1.85 |
| $SO_4$ | .45 | — | .45 |
| $PO_4$ | 62.00 | — | 62.00 |
| Total | 64.30 | 27.76 | 92.06 |
| | Output Gms. | | |

-continued

| Solids Composition | Input Gms. | | |
|---|---|---|---|
| | Still Bottoms 46 | CaO 48 | Total |
| | Filtrate 53 | Cake 52 | Total |
| Ca | .46 | 28.09 | 28.55 |
| K | 1.74 | .29 | 2.03 |
| SO$_4$ | .25 | .38 | .63 |
| PO$_4$ | 7.32 | 60.71 | 68.03 |
| Total | 9.77 | 89.47 | 99.24 |

In the above table it will be noted that the recycle stream in lines 52 or 53, or either alternative procedure, provides means for recycle of a stream primarily a calcium phosphate of unknown composition with small amounts of potassium and sulfate ion present rather than strong phosphoric acid.

EXAMPLE XV

In this example there is illustrated the recovery procedure shown in FIG. II with the alternative procedures involving (1) addition of calcium oxide to the stream to adjust the K:P ratio, and (2) without addition of calcium oxide to the feed stream. In this example, the feed streams are identified by number with reference to FIG. II to illustrate the particular ions present in each stream and demonstrate the final products obtained.

A. In the first section of this experiment, the processing of the top stream in FIG. II is utilized, that is, without the addition of calcium oxide to neutralize and vary the potassium to phosphorous ratio in the product. In this example the solid feed or Product A is shown as in line 42, the amount of water added in line 55, the resulting filter cake in line 58, and the Product B in line 72 and Product C in line 77. The results of this experiment are set forth in the following table.

| Solids Comp. | Input Gms. | | | Output Gms. | | Product C Wt. % 77 |
|---|---|---|---|---|---|---|
| | Solid Feed 42 | Water 55 | Total | Product B 72 | Filter Cake 58 | |
| Ca | 0 | — | 0 | 0 | — | — |
| K | 55.81 | — | 55.81 | 20.51 | (Not | 49% K$_2$O |
| SO$_4$ | 13.72 | — | 13.72 | 4.27 | Analyzed) | 5% SO$_4$ |
| PO$_4$ | 80.46 | — | 80.46 | 31.35 | | 46% P$_2$O$_5$ |
| H$_2$O | — | 150 | 150.00 | — | | — |
| Total | 149.99 | 150 | 299.99 | 56.13 | 87.1 | — |

In experiment A it is especially to be noted that the final Products B and C are high in K and P as determined by the K$_2$O/P$_2$O$_5$ ratio and thus are high plant food fertilizers.

B. In the following table there is set forth the results obtained when operating with the alternative procedure of FIG. II including the addition of calcium oxide to neutralize the mixture and thus vary the potassium to phosphorous ratio in the product. In the table, there is set forth the composition of the solid Product A as obtained from the process of FIG. II in line 42, the amount of calcium oxide added in line 64, the amount of water added in line 55 and the final composition in line 72 of Product B'. The calcium oxide treatment was conducted at 75°C. with agitation of the reactor and the separator was a three-stage filter. The following table sets forth the results of this run:

| Solids Composition | Input Gms. | | | | Output Gms. Product B' 72 | |
|---|---|---|---|---|---|---|
| | Solid Feed 42 | CaO 64 | Water 55 | Total | | |
| Ca | .1 | — | — | .1 | 0 | Recycle |
| K | 27.3 | — | — | 27.3 | 12.64 | cake and |
| SO$_4$ | 2.5 | — | — | 2.5 | 1.04 | water |
| PO$_4$ | 68.0 | — | — | 68.0 | 20.82 | not |
| CaO | — | 9.6 | — | 9.6 | — | analyzed |
| H$_2$O | — | — | 150.0 | 150.0 | — | |
| Total | 97.9 | 9.6 | 150.0 | 257.5 | 34.50 | |

In the above table for this example, it will be noted that this procedure enables the preparation of products wherein the K:P ratio may be controlled as desired to provide fertilizer materials of very high plant food content.

EXAMPLE XVI

In this example there is set forth the work-up procedure and alternatives of FIG. III. In portion A of this example, the feed stream is subjected to neutralization with ammonia without adjustment of the K:P ratio to provide a highly valuable N-P-K fertilizer. As in other examples, the feed streams are identified by the reference numerals of FIG. III, and illustrate in this manner the particular ions in each feed and in the products obtained.

A. In the first portion of this experiment the solid feed cake or product A in line 78 was initially dissolved in water from line 80 of about equal volume and ammonia added thereto from line 83 at room temperature with agitation. The resulting mixture was separated in a three-stage filter to remove the solid products in line 97 and provide a solution product in line 98 identified as Product E. The following table illustrates this process and sets forth the ions present in each feed stream and the final product.

| Solids Composition | Input, Gms. | | | |
|---|---|---|---|---|
| | Solid Feed 78 | Water 80 | NH$_3$ 83 | Total |
| Ca | .15 | — | — | .15 |
| K | 54.45 | — | — | 54.45 |
| SO$_4$ | 39.30 | — | — | 39.30 |
| PO$_4$ | 59.25 | — | — | 59.25 |
| H$_2$O | — | 150.0 | — | 150.00 |
| NH$_3$ | — | — | 3.30 | 3.30 |
| Total | 153.15 | 150.0 | 3.30 | 306.45 |

| Solids Composition | Output, Gms. | | |
|---|---|---|---|
| | Cake 97 | Product E 98 | Total |
| Ca | — | .04 | .04 |
| K | 26.56 | 27.24 | 53.80 |
| SO$_4$ | 25.72 | 2.00 | 27.72 |
| PO$_4$ | 9.73 | 47.77 | 57.50 |
| H$_2$O | 54.78 | 95.22 | 150.00 |
| NH$_3$ | — | 3.30 | 3.30 |

-continued

| Solids Composition | Input, Gms. | | | |
|---|---|---|---|---|
| | Solid Feed 78 | Water 80 | $NH_3$ 83 | Total |
| Total | 116.79 | 175.57 | | 292.36 |

It will be noted with respect to the above table that the final solution product is very low in sulfate ion concentration and high in plant food values of potassium, phosphorus, and nitrogen and thus provides a good N-P-K fertilizer.

B. The second portion of this example illustrates the lower section of FIG. III wherein an aqueous stream of Product A is treated with calcium oxide and ammonia to vary the potassium to phosphorous ratio as the stream is neutralized and also to provide nitrogen values by the addition of ammonia. In this stream the calcium oxide and ammonia were added successively to the reactor at room temperature and the separator was a three-stage filter. As in the other examples, the ions present in each feedstream are indicated with reference to the numerals of FIG. III. Thus Product A or the solid feed in line 78 is mixed with water from line 80 to form a solution and after filtration, the solution is treated with CaO from line 88 and $NH_3$ from line 89 in reactor 90. After filtration, the final solution Product E' is recovered in lines 94 and 98. This experiment is as follows:

| Solids Composition | Input, Gms. | | | | |
|---|---|---|---|---|---|
| | Solid Feed 78 | Water 80 | CaO 88 | $NH_3$ 89 | Total |
| Ca | .12 | — | 9.63 | — | 9.75 |
| K | 27.30 | — | — | — | 27.30 |
| $SO_4$ | 2.50 | — | — | — | 2.50 |
| $PO_4$ | 68.00 | — | — | — | 68.00 |
| $H_2O$ | — | 150.00 | — | — | 150.00 |
| N | — | — | — | 3.0 | 3.00 |
| Total | 97.92 | 150.00 | 9.63 | 3.0 | 260.55 |

| Solids Composition | Output Gms. | |
|---|---|---|
| | Cake 93 | Product E' 98 |
| Ca | No | 0.0 |
| K | Analysis | 12.64 |
| $SO_4$ | | 1.04 |
| $PO_4$ | | 20.82 |
| $H_2O$ | | 119.21 |
| N | | 3.00 |
| Total | | 156.71 |

From the above examples, it will be seen that the final solution Product E' contains very little sulfate ion, and is very high in N-P-K values. Also a comparison of the K:P ratio in Examples XVI-A and XVI-B will clearly demonstrate the very definite adjustment of the ratio of K:P.

EXAMPLE XVII

This example illustrates the solvent treatment procedure of FIG. IV and particularly shows the ions present in the feed stream 111 coming from the second separator 108, the amount of solvent introduced by line 113 in the solvent treatment section 112 and the constitution of the filter cake in line 121 which is sent to subsequent solvent recovery and polymerization to form final Product G. Also, the amount of water taken off through line 132 and the constitution of solution Product F in line 133 are shown. Thus, this example provides a fertilizer useful in areas where high sulfate content would be desirable. As with the other examples, the particular ions in each feed stream or cake are illustrated with respect to FIG. IV and the reference numerals used therein. In the solvent treatment section, the solvent employed is methanol on a basis of about 60 percent by weight of the total weight of the filtrate stream. The solvent treatment was conducted at room temperature with agitation. The results of this example are as follows:

| Solids Composition | Input Gms. | | |
|---|---|---|---|
| | Filtrate 111 | Methanol 113 | Total |
| Ca | .02 | — | .02 |
| K | 11.84 | — | 11.84 |
| $SO_4$ | 2.68 | — | 2.68 |
| $PO_4$ | 17.26 | — | 17.26 |
| $H_2O$ | 168.22 | — | 168.22 |
| MeOH | — | 120.00 | 120.00 |
| Total | 200.02 | 120.00 | 320.00 |

| Solids Composition | Output, Gms. | | | |
|---|---|---|---|---|
| | Cake 121 | $MeOH/H_2O$ 119/132 | Product F 133 | Total |
| Ca | .02 | — | 0.0 | .02 |
| K | 6.45 | — | 5.24 | 11.69 |
| $SO_4$ | 2.75 | — | .22 | 2.97 |
| $PO_4$ | 10.76 | — | 6.99 | 17.75 |
| $H_2O$ | 8.41 | 104.0 | 55.76 | 168.17 |
| MeOH | — | 120.0 | — | 120.00 |
| Total | 28.39 | 120.0/104.0 | 68.21 | 320.60 |

In reviewing the results of the above table it will be seen that the final solution products are substantially equal in potassium and phosphate ion values.

EXAMPLE XVIII

This example illustrates the process defined as a high phosphoric acid run or a run in which high ratios of phosphoric acid are used in the main reactor. In this example the procedure of FIG. I was employed including by-passing sulfate reduction reactor 20 and the bottoms from solvent still 40 were recycled directly to main reactor 9 by line 45. Thus, this example illustrates how use of high $H_3PO_4$ levels in the reactor effectively reduce the sulfate levels in the system without the optional sulfate reduction steps.

In this example the components in each stream and the amount thereof are identified with reference to the particular stream number or reactor number in FIG. 1. The main reactor was maintained at 75°C. The input and output in grams of the various ions in each stream are set forth in the following table:

| Solid Composition | Input Gms. | | | | | Output Gms. | | |
|---|---|---|---|---|---|---|---|---|
| | Rock 11 | $KHSO_4$ 8 | $H_2SO_4$ 10 | $H_3PO_4$ 45 | Total | Cake 15 | Filtrate 19 | Total |
| Ca | 110.5 | — | — | — | | 110.5 | 86.8 | 1.7 8! |
| K | — | 65.7 | — | — | 65.7 | 3.0 | 62.8 | 65.8 |
| $SO_4$ | — | 183.0 | 103.3 | — | 286.3 | 202.2 | 38.1 | 240.3 |
| $PO_4$ | 138.0 | — | — | 142.4 | 280.4 | 3.3 | 299.7 | 303.0 |

-continued

| Solid Composition | Input Gms. | | | | | Output Gms. | | |
|---|---|---|---|---|---|---|---|---|
| | Rock 11 | KHSO$_4$ 8 | H$_2$SO$_4$ 10 | H$_3$PO$_4$ 45 | Total | Cake 15 | Filtrate 19 | Total |
| Total | 248.5 | 248.7 | 103.3 | 142.4 | 742.9 | 295.3 | 402.3 | 697.6 |

In reviewing the results of the above table it will be observed that a substantial amount of H$_3$PO$_4$ is included in the reaction (line 45) and that the filtrate in line 19 is relatively low in sulfate ion content. The CaSO$_4$ cake in line 15 was very easy to filter.

EXAMPLE XIX

This example illustrates the procedure of FIG. V-A and particularly shows the feed stream composition before and after ammonia treatment with a saturated aqueous ammonia solution, the solids content in line 141 after filtration, and the nitrogen, potassium and phosphate values after ammonia stripping, which concentration of N-P-K values will be in final Products H or I. The data for this experiment are as follows:

| Solids Composition | Input gms. | | | output gms. | |
|---|---|---|---|---|---|
| | Feed Filtrate 136 | NH$_3$ 138 | | Filtrate 145 | Cake 141 |
| Ca | .50 | | | | .44 |
| K | 10.24 | | | 10.16 | .17 |
| SO$_4$ | 1.72 | | | 1.83 | — |
| PO$_4$ | 33.59 | | | 28.54 | 2.84 |
| NH$_4$ | | 7.53 | | 7.18 | .35 |
| Total | 46.05 | 7.53 | | 47.71 | 3.80 |

In the above experiment neutralization with NH$_3$ was at room temperature to a pH of 10.8. The ammonia stripper was a distillation system.

The invention has been illustrated herein by reference to certain preferred embodiments. However, it is to be understood that the invention is not to be limited as obvious variations thereon will become apparent to those skilled in the art.

What is claimed is:

1. In a continuous process for the preparation of potassium dihydrogen phosphate by the steps involving the reaction of phosphate rock or solubilized form thereof with sulfuric acid, potassium hydrogen sulfate and recycle phosphoric acid at a temperature of about 40°–90°C. in a main reactor to form a resulting slurry containing KH$_2$PO$_4$, H$_3$PO$_4$ and precipitated calcium sulfate, removing the calcium sulfate solid from the mixture, precipitating KH$_2$PO$_4$ from the resultant solution by addition of an organic solvent, recovering the KH$_2$PO$_4$ from the phosphoric acid solution, removing the organic solvent from the phosphoric acid solution, and recycling at least a portion of the phosphoric acid solution to the main reactor, the improved steps which comprise:
   a. conducting the initial step of the reaction by initially charging a mixture of phosphate rock or solubilized form thereof, sulfuric acid and recycle phosphoric acid to a reactor and adding to the material at a controlled rate at 10–50 weight percent aqueous solution of KHSO$_4$ until substantially complete reaction is obtained for the formation of filterable calcium sulfate crystals; and
   b. removing the calcium sulfate crystals to provide a filtrate and evaporating the resultant filtrate to obtain a solids concentration of greater than about 40 wt. percent prior to precipitation of the KH$_2$PO$_4$.

2. A process according to claim 1 wherein the potassium hydrogen sulfate added to the main reactor is formed by the reaction of potassium chloride and sulfuric acid with removal of hydrogen chloride gas, the resulting potassium hydrogen sulfate is dissolved in water to attain about a 10 to 50 weight percent aqueous solution containing about 4 to 10 weight percent of sulfuric acid, and adding to the main reactor in a controlled manner.

3. A process according to claim 1 wherein the filtrate from step (b), after removal of the calcium sulfate, and prior to passing to the evaporator, is treated for sulfate reduction by contacting with a member selected from the group consisting of calcium oxide or equivalent calcium bearing material, phosphate rock and mixtures thereof to form a slurry, and separating the slurry to provide a solid and a filtrate.

4. A process according to claim 3 wherein the sulfate reduction step is carried out by passing the filtrate to a reactor maintained at a temperature of 40° to 90°C. and there is added thereto a molar quantity of calcium oxide substantially equal to the molar quantity of SO$_4^=$ in the filtrate, the resulting mixture is sent to a separator, the calcium sulfate solids formed are removed therefrom and the filtrate is sent to said evaporator.

5. A process according to claim 3 wherein the sulfate reduction step is carried out by adding phosphate rock to the filtrate in a reactor maintained at a temperature of 40° to 90°C., the resulting solids are removed to said main reactor and the resulting filtrate is passed to the evaporator.

6. A process according to claim 1 wherein said phosphoric acid, after removal of the organic solvent is passed to a reactor where it is treated with calcium oxide or equivalent calcium-bearing material to form a calcium phosphate slurry and the resulting slurry is recycled to the main reactor for further conversion.

7. A process according to claim 6 wherein the resulting slurry, after treatment with the calcium oxide or equivalent calcium bearing material is passed to a separator to provide a resulting solid and a filtrate, said resulting solid is recycled to the main reactor and said filtrate is recycled as make-up water for the solution of KHSO$_4$.

8. A process according to claim 1 wherein said solid potassium dihydrogen phosphate product is subsequently dried and polymerized by heating at a temperature of about 250° to 850°C. to provide a polymerized potassium phosphate product.

9. A process according to claim 1 wherein said recovered solid potassium dihydrogen phosphate product is contacted with water, any undissolved solids are removed in a separator to form a filtrate, the solids are withdrawn from the system and there is recovered a filtrate solution comprising potassium dihydrogen phosphate product.

10. A process according to claim 9 wherein sufficient water is evaporated from said filtrate to form a wet cake, and said wet cake is dried to provide a solid potassium dihydrogen phosphate product.

11. A process according to claim 9 wherein said filtrate is neutralized with calcium oxide to adjust the potassium to phosphorus ratio, the resulting mixture is separated to form a solid and a second filtrate, the recovered solid is removed, and the second filtrate, comprising an aqueous solution of a mixture of potassium phosphates, is recovered.

12. A process according to claim 11 wherein said second filtrate is evaporated to dryness to form a solid, and the solid is dried to provide a solid potassium phosphate product.

13. A process according to claim 12 wherein said dried product is polymerized by heating at temperatures of about 250° to 850°C. to provide a polymerized potassium phosphate product.

14. A process according to claim 1 wherein said potassium dihydrogen phosphate solid product is dissolved in water, the resulting aqueous solution is re-acted with about 1 to 3 weight percent of ammonia, urea, $NH_4NO_3$, or mixtures thereof, the resulting mixture is separated to form a solid and filtrate solution, said solid is removed, and said solution is recovered as a solution product containing values of nitrogen, phosphorus and potassium.

15. A process according to claim 1 wherein said solid potassium dihydrogen phosphate product is contacted with water to form solids and a solution, the solids are removed in a separator, said solution is treated with calcium oxide and ammonia, urea, $NH_4NO_3$ or mixtures thereof, the mixture is separated to provide a solid and a solution, the solids are removed in a separator and the solution is recovered as a solution product containing values of nitrogen, phosphorus and potassium.

16. A process according to claim 1 wherein the filtrate from step (b), after removal of the calcium sulfate, is subjected to sulfate reduction by contacting with a member selected from the group consisting of calcium oxide, phosphate rock and mixtures thereof to form a slurry, separating said slurry to form a solid and a filtrate, contacting said filtrate with sufficient ammonia to neutralize to a pH of about 10.5 to 11.0 whereby a slurry is formed, separating said slurry to form a solid ammonium phosphate which is removed from the system and a filtrate solution, removing the ammonia from said filtrate solution and recycling to the ammonia neutralization step, evaporating about 10 to 50 percent of the liquid from said filtrate solution, and recovering a solution product containing nitrogen, potassium and phosphate values.

17. A process according to claim 16 wherein the filtrate solution is evaporated to dryness, the resulting product is dried at a temperature of about 100° to 200°C. to provide a solid product containing nitrogen, potassium and phosphate values.

18. A process according to claim 16 wherein the dried product is polymerized by heating at a temperature of about 250° to 850°C. to provide a solid polymerized product containing nitrogen, potassium and phosphate values.

19. A process according to claim 1 wherein said solid potassium dihydrogen phosphate product is contacted with water, the resulting slurry is separated to provide a solid and a filtrate solution, said solid is recycled to the main reactor, said filtrate solution is contacted with sufficient ammonia to neutralize to a pH of about 10.5 to 11.0 and form a slurry, said slurry is separated in a separator to form a solid ammonium phosphate which is removed from the system and a filtrate solution, the ammonia is removed from said filtrate solution and recycled to the neutralization step and there is recovered a filtrate solution containing nitrogen, potassium and phosphate values.

20. A process according to claim 19 wherein the filtrate solution is evaporated to dryness and the resulting product is dried at a temperature of about 100° to 200°C. to provide a solid product containing nitrogen, potassium and phosphate values.

21. A process according to claim 20 wherein the dried product is polymerized by heating at a temperature of about 250° to 850°C. to provide a solid polymerized product containing nitrogen, potassium and phosphate values.

22. A process according to claim 1 wherein said filtrate from step (b), after removal of the calcium sulfate, is evaporated to remove 20 to 50 weight percent of the water to provide a concentrate, said concentrate is contacted with a member selected from the group consisting of ammonia, urea, $NH_4NO_3$ and mixtures thereof, the resulting slurry is removed to a granulator, the water is removed and the resulting mixture is granulated to provide a granulated product containing values of nitrogen, potassium and phosphates.

23. A process according to claim 3 wherein said filtrate from said sulfate reduction step is evaporated to remove 10 to 50 weight percent of the water and provide a concentrate, contacting said concentrate with a member selected from the group consisting of ammonia, urea, $NH_4NO_3$ and mixtures thereof, removing the resulting slurry to a granulator, removing the water and granulating to provide a granulated product containing values of nitrogen, potassium and phosphates.

24. In a continuous process for the preparation of potassium dihydrogen phosphate by the steps involving the reaction of phosphate rock or solubilized form thereof with sulfuric acid, potassium hydrogen sulfate, and recycle phosphoric acid at a temperature of about 40°–90°C. in a main reactor to form a resulting slurry containing $KH_2PO_4$, $H_3PO_4$ and precipitated calcium sulfate, removing the calcium sulfate solid from the mixture, precipitating $KH_2PO_4$ from the resultant solution by addition of an organic solvent, recovering the $KH_2PO_4$ from the phosphoric acid solution, removing the organic solvent from the phosphoric acid solution, and recycling at least a portion of the phosphoric acid solution to the main reactor, the improved steps which comprise:

a. conducting the initial step of the reaction by initially charging a mixture of phosphate rock or solubilized form thereof, sulfuric acid and recycle phosphoric acid to a reactor and adding to the material at a controlled rate a 10–50 wt. percent aqueous solution of $KHSO_4$ until substantially complete reaction is obtained for the formation of filterable calcium sulfate crystals;

b. continuously passing the resulting slurry to a first separator where the solid calcium sulfate precipitate is removed to leave a filtrate solution;

c. continuously washing the solid in the separator with water and recycling the strong wash to the main reactor;

d. removing the filtrate solution from said first separator and passing to a second reactor and reacting with a member selected from the group consisting of calcium oxide or equivalent calcium bearing material, phosphate rock, solubilized forms thereof and mixtures thereof, at a temperature of about 40° to 90°C.;

e. passing the resulting slurry to a separator to provide solids and a filtrate, removing the resulting solids;

f. passing the filtrate to an evaporator and evaporating to obtain a solids concentration of greater than about 40 weight percent;

g. passing the resulting concentrated mixture to a solvent treatment precipitation step and contacting with a sufficient amount of an organic solvent selected from the group consisting of lower alkyl alcohols and lower alkyl ketones to precipitate solid potassium dihydrogen phosphate; and h. passing the slurry resulting form the organic solvent precipitation step to a separator to obtain solid potassium dihydrogen phosphate and an organic solvent solution, removing the solids and drying to provide a solid $KH_2PO_4$ product, passing the solvent solution to a solvent recovery stage, removing the solvent and recycling to the precipitation step and recovering a solvent-free phosphoric acid solution suitable for recycle to the main reactor as recycle phosphoric acid.

\* \* \* \* \*

UNITED STATES PATENT OFFICE
CERTIFICATE OF CORRECTION

PATENT NO. : 3,956,464

DATED : May 11, 1976

INVENTOR(S) : Erhart K. Drechsel, John B. Sardisco and James R. Stewart, Jr.

It is certified that error appears in the above-identified patent and that said Letters Patent are hereby corrected as shown below:

Column 1, line 9, after "1970" insert --now U.S. Patent 3,697,246, issued October 10, 1972--;

Column 5, line 65, after "$PO_4$" insert -- $\equiv$ --;

Column 6, line 65, after "$PO_4$" insert -- $\equiv$ --;

Column 7, line 1, after "$K^+/PO_4$" insert -- $\equiv$ --;

Column 8, line 18, after "$PO_4$" insert -- $\equiv$ --;

Column 8, line 57, delete "0.71:1";

Column 16, line 15, after "$PO_4$" insert -- $\equiv$ --;

Columns 15 and 16, Table I, under the heading "Reactor Temperature (°C), I", move the column beginning with "33" under "I";

Column 19, lines 1-4, these lines pertain to the first portion of the Table and not the second portion therefore they should be deleted;

Column 19, line 14, before "either" delete "or" and insert --by--;

Column 21, lines 1-4, delete these headings and insert the following headings:

|  | Output, Gms. | | |
|---|---|---|---|
| Solids | Cake | Product E | |
| Composition | 97 | 98 | Total |

UNITED STATES PATENT OFFICE
CERTIFICATE OF CORRECTION

PATENT NO. : 3,956,464
DATED : May 11, 1976
INVENTOR(S) : Erhart K. Drechsel, John B. Sardisco and James R. Stewart, Jr.

It is certified that error appears in the above-identified patent and that said Letters Patent are hereby corrected as shown below:

Column 22, line 25, under heading "Solids Composition", delete "So$_4$" and insert --SO$_4$--;

Column 22, Table at the bottom of the page, line beginning with "Ca", under heading "Total" insert --110.5-- in the blank;

Column 22, Table at the bottom of the page, line beginning with "Ca", under heading "Cake 15", delete "110.5" and insert --86.8--

Column 22, Table at the bottom of the page, line beginning with "Ca", under heading "Filtrate 19", delete "86.8" and insert --1.7--;

Column 22, Table at the bottom of the page, line beginning with "Ca", under heading "Total", second occurrence, delete "1.7" and insert --88.5--; and delete the "8" in the margin; and Column 28, line 3, delete "form" and insert --from--.

Signed and Sealed this

Tenth Day of August 1976

[SEAL]

Attest:

RUTH C. MASON
Attesting Officer

C. MARSHALL DANN
Commissioner of Patents and Trademarks